Patented Jan. 10, 1933

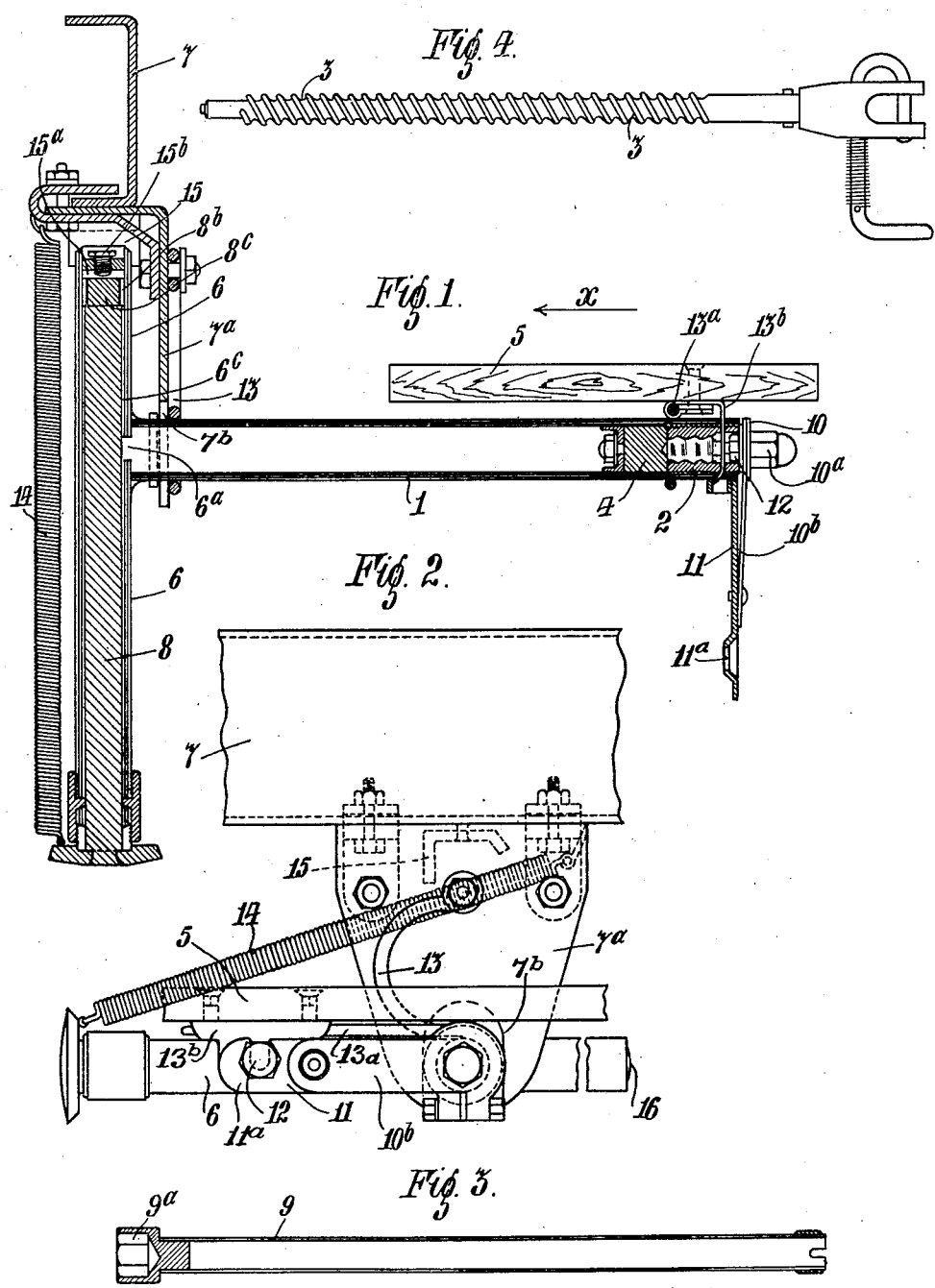

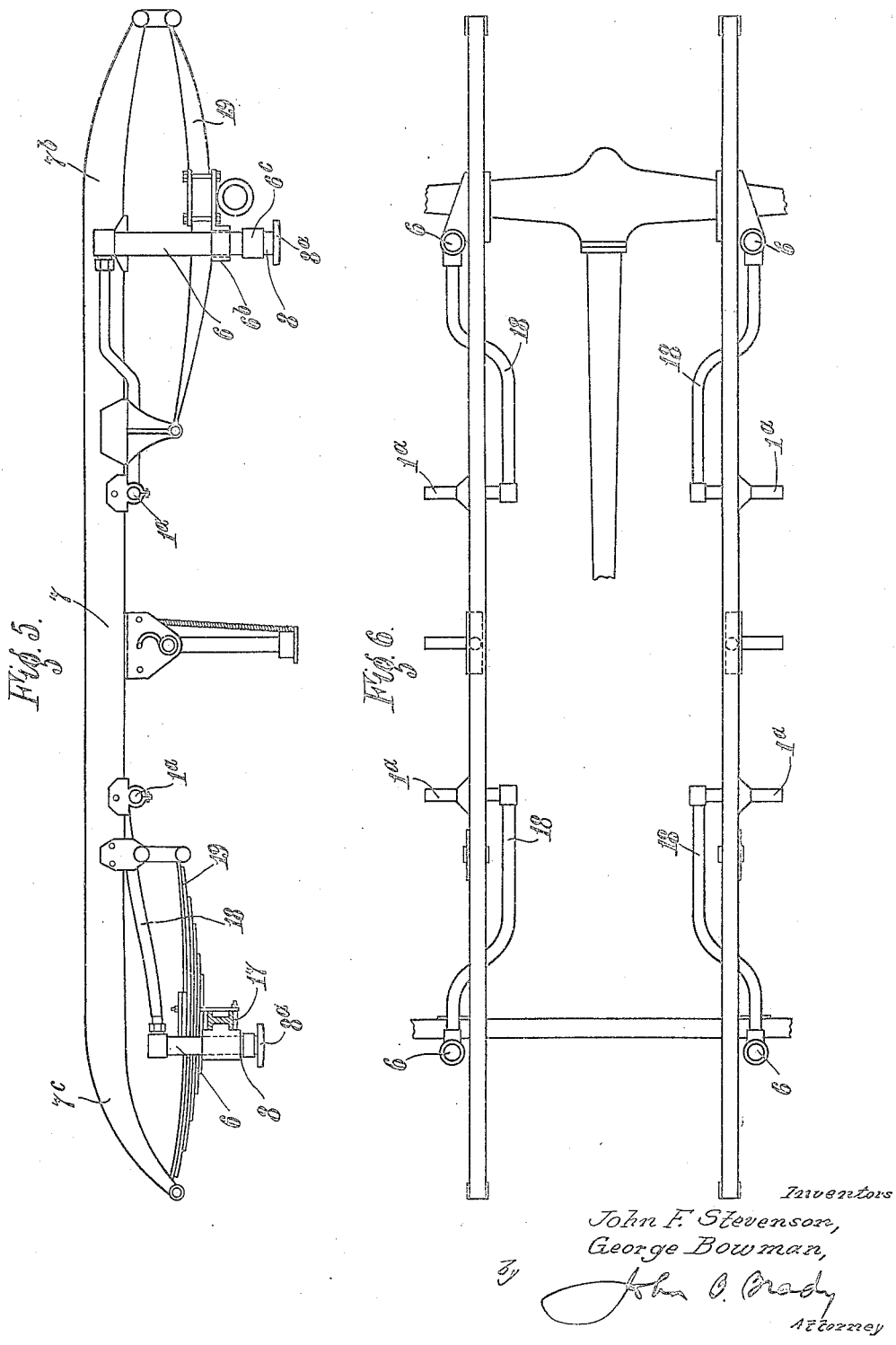

1,893,848

UNITED STATES PATENT OFFICE

JOHN FERGUSON STEVENSON AND GEORGE BOWMAN, OF BELFAST, NORTHERN IRELAND

JACKING DEVICE FOR ROAD VEHICLES

Application filed September 18, 1930, Serial No. 482,841, and in Great Britain February 7, 1930.

This invention relates to fluid pressure jacking apparatus for vehicles, and is applicable to such jacking apparatus whether attached to or built into the vehicle.

The object of the invention is to provide fluid pressure jacking apparatus which, in contrast to existing hydraulic jacking apparatus, is capable of functioning entirely without the use of valves. A further object of the invention is to provide jacking apparatus in which the jacking mechanism can be conveniently situated at the part of the vehicle where lifting force can be most effectively applied, while the operating device whereby the jacking mechanism is put into action is located at an easily accessible part of the vehicle.

According to the invention, we provide pressure fluid jacking apparatus in which the jacking mechanism is operable through pressure fluid by a self-locking operating device, the jacking mechanism being so operated by the self-locking device through the pressure fluid that the vehicle is raised and kept in raised position until the operation of the self-locking device is reversed.

The self-locking operating device may be a screw-and-nut arrangement or other device which is self-locking in action either by virtue of its construction or by being provided with a rack and pinion having a locking pawl or like means whereby free reverse movement of the device is prevented when not desired.

The invention may be applied to two jacks, fitted one at each side, or one at each end, of a vehicle, or to four jacks fitted to the axles or frame adjacent to each wheel of a vehicle.

The invention will now be described with reference to the accompanying drawings, wherein:

Fig. 1 is a sectional elevation of a preferred form of fluid pressure vehicle-lifting jack in accordance with the invention and showing the jack in its ready for action position.

Fig. 2 is an elevation looking in the direction of the arrow X in Fig. 1, but showing the jack raised and turned into its "housed" or "out of action" position;

Fig. 3 is a view of an operating member for removing a cover from the fluid reservoir so as to permit operation of the jack;

Fig. 4 is a view of a fluid operating screw for the jack;

Figs. 5 and 6 are respectively elevation and plan views of a vehicle chassis frame, showing other examples of carrying out the invention and embodying the centrally disposed jacks shown at Figs. 1 and 2.

Referring to the drawings:—

In the preferred construction shown at Figs. 1 and 2, we provide one jack permanently attached at each side of a vehicle and adapted to lift both wheels of the vehicle on the side at which the jack is attached.

As shown, we use a grease reservoir or tube 1 with an internally screw-threaded bushing or equivalent 2 to receive a driving screw 3 which is adapted to operate the fluid displacing piston 4, and which, when not in use, can be stowed away in a part of the vehicle. This tube 1 is attached at one end to some easily accessible portion of the vehicle, in the example, the running board 5, and at its other end is welded or otherwise suitably attached to another tube 6, preferably at right angles to the tube 1, the latter being attached to the chassis frame 7 by a spring support 13, or it may be resiliently attached to any other suitable portion of the vehicle where the lifting or jacking force can be suitably applied. This tube 6 forms the jack casing, in which works the extensible portion or plunger member 8 of the jack. From the screw tube or reservoir 1, grease is adapted to pass through the hole or port $6^a$, up the annular space $6^c$ between the extensible jack portion or plunger member 8 and the casing 6, and through the vertical flutes or grooves $8^b$ of a collar-piece $8^c$, into the space $15^a$ at the top of the jack. The piston operating screw 3, shown separately at Fig. 4, can be inserted into an independent sleeve 9 (Fig. 3) having a box nut 9ª at one end adapted to engage a nut 10ª on the cover or closing cap 10 of the tube 1. The sleeve 9 is normally stowed away on the vehicle along with the driving screw 3, and in addition to its use as a spanner for the cap 10, it may serve to operate the ordinary wheel nuts. The cap 10 is connected with a member 10ᵇ which is pivoted to a projection 11 on the outer end of the tube 1, which projection 11 has a slotted end 11ª adapted to co-operate with a screw and nut 12 mounted below the running board 5 on a small bracket 13ᵇ, in order to clamp the tube 6 in horizontal position as shown at Fig. 2. As will be clear from Fig. 1, the outer end of the reservoir tube 1 is carried by a fixed ring 13ª carrying the bracket 13ᵇ, the mounting of the reservoir tube on the running board 5 allowing the said tube to accommodate itself to vertical play of the inner end of the reservoir tube as permitted by a slot 7ᵇ in a bracket 7ª.

The screw 3 may be replaced by a rack and pinion provided with a pawl to make it self-locking, or any other device which is self-locking either by virtue of its intrinsic construction or by fitment of additional means thereto which may be used. The same fluid operating device may be used to operate the fluid in a plurality of jacks.

The return of the fluid to the reservoir tube 1ª is effected by operating the grease-forcing screw or other self-locking operating device in the reverse manner from that adopted when the vehicle is raised, whereupon the weight of the vehicle causes the grease to be forced out of the the jack casing into the reservoir and allows the vehicle to lower.

Preferably, the screw tube or fluid container 1 is, as regards relative vertical movement, flexibly attached to the frame 7 and running board 5 as shown, the spring 13 secured to the bracket 7ª forming the main support for the jack. The fluid tube 1 of the jack is held against fore and aft movement relatively to the running board and is free to move in other directions.

In attaching a jack, as described, to a vehicle, the bracket 7ª carrying the jack is preferably so constructed that the jack-carrying bracket can be hooked on and clamped to the chassis frame 7 without making holes therein, the bracket being secured in position by pinching screws as shown, or otherwise.

Preferably the fluid tube or reservoir 1 is turnably mounted on the bracket 7ª supporting same and the jack casing 6, attached thereto, would be capable of being turned thereby from a vertical (in use) position (see Fig. 1) to a horizontal (out of use) position (see Fig. 2) and vice versa. The jack is held in the vertical position by a spring 14 attached at one end to the bottom of the extending member 8 of the jack and at the other end to the bracket 7ª. This spring 14 holds the jack vertically against a stopper 15 on the bracket 7ª and a projection 16 on the top of the jack casing is caused to engage in a hole or recess in the stopper 15 to lock the jack in the vertical position. The spring 13 attached to the bracket 7 presses on the top of the tube 1, which works in an oval or loose hole in the bracket 7ª, the spring 13 tending to keep the tube 1 down and the locking projection 16 at the top of the jack out of engagement with the hole or recess in the stopper 15 except when the jack is actually on the ground and the weight of the vehicle is upon it. This locking device prevents any possibility of lateral displacement while the jack casing 6 is forced up by the operating fluid.

It should be noted that the extension spring attached at one end to the extending member of the jack and at the other end to the chassis bracket of the jack serves a three fold purpose. Firstly, it holds the jack in a horizontal position when the jack is out of use and facilitates the tightening of a positive locking device provided at or near the outer edge of the running board of the vehicle. Secondly, this spring serves to hold the jack in the vertical or "in use" position until it is positively locked as hereinbefore described. Thirdly, the said spring serves to ensure the return of the extension member of the jack.

It should also be noted that the turning of the screw tube or fluid reservoir when bringing the jack into operative position may, by suitable means, be used to limit the distance which it is necessary to raise the spring portion of the vehicle before also raising the vehicle wheels. The means employed may be flexible wire, links, or equivalent so connecting the jack with the vehicle axles that the movement of the jack from the inoperative to the operative position automatically limits the distance which it is necessary to raise the sprung portion of the vehicle before also raising the vehicle wheels.

Means may be provided for replenishing the operating fluid in the reservoir 1. A screw plug 15ᵇ at the top of the jack casing 6 is shown for this purpose in Fig. 1.

In Figs. 5 and 6 we have shown the centrally disposed jacks, illustrated at Figs. 1 and 2, in position. We have also shown in these figures two other ways of carrying out the invention.

In the one example of the invention illustrated at Figs. 5 and 6, two of the fluid pressure jacks are shown attached to the axle 17 at the front 7ᶜ of the chassis frame 7 and in this case two other jacks would also be attached to the rear axle. The top of the jack casing in this case is connected by a flexible tube 18 with the fluid tube or reservoir 1ª which is mounted rigidly below the chassis frame 7. In operation, the screw handle is applied as hereinbefore described to transfer the operating fluid from the tube 1ª to the jack casing 6, the return of the fluid to the tube 1ª being as hereinbefore described.

In the other example illustrated at Figs. 5 and 6 two fluid pressure jacks are shown attached to the rear end of the chassis frame 7ᵇ, and in this example one jack would be attached to the frame adjacent to each of the four wheels. The jack casing 6 is connected by a tube with the fluid tube or reservoir 1ª, but in this case the top of the jack casing is connected with the chassis frame and a bracket 6ᵇ secured to the springs 19 above the axle, embraces the jack casing which is free to slide through said bracket. In operation, when the jack foot 8ª reaches the ground the chassis frame will be raised and the jack casing 6 will rise with it until the enlarged bottom end of the casing 6ᶜ comes against the bracket 6ᵇ whereupon the axle and wheel of the vehicle will be raised, if required, up to the limit of the extension of the jack ram or plunger member 8. In this case also the operation for transferring the fluid from the reservoir 1ª to the jack casing and back again from the jack casing to the reservoir 1ª is effected as already described above. In this case, the extending or plunger member 8 may be made hollow to receive suitable springs which are adapted to hold the extending member 8 in the "out of use" position.

Various modifications may be made in the jacking apparatus described without departing from the scope of the invention. For example, in addition to the self-locking operating device hereinbefore mentioned, we may incorporate in the operating arrangement a self-locking worm wheel to control the worm drive.

We claim:—

1. Jacking apparatus for vehicles, the combination of a jack, comprising a plunger element, a pressure fluid reservoir for said jack, a resilient connection adapted to permit vertical movement of said reservoir bodily on a readily accessible part of the vehicle, a second resilient connection adapted to permit vertical movement of the jack for said reservoir bodily and arranged in proximity thereto on a part of the vehicle adapted for effective application of lifting force, and means for forcing pressure fluid from said reservoir to said jack so as to raise the vehicle.

2. Jacking apparatus for vehicles comprising the combination of a jack comprising a plunger element, a pressure fluid reservoir for said jack, a resilient connection for supporting the reservoir and jack permanently at the middle of each side of the vehicle and adapted to permit vertical movement of said reservoir and jack bodily, means for forcing pressure fluid from said reservoir to said jack in order to raise the wheels at the corresponding side of the vehicle.

3. Fluid pressure jacking apparatus for vehicles comprising a pressure fluid reservoir, an extensible jack comprising a plunger element, means whereby said jack is operable by said pressure fluid, spring means connected between said jack and the frame of said vehicle for supporting said reservoir and jack permanently at the middle of each side of said vehicle, a rigid fixture located on said vehicle above said jack and adapted during the jacking operation to be placed firmly on said jack by the weight of the vehicle against the action of said spring means, means whereby said jack is adapted for swinging movement in one plane into and out of its operative position, and depending means so provided on said rigid fixture as to project downwards alongside the head of said jack when in the operative position so that said fixture when pressing on said jack constitutes a positive barrier in the path of said jack to prevent displacement from its operative position.

4. Fluid pressure jacking apparatus for vehicles comprising a pressure fluid reservoir, an extensible jack comprising a plunger element, a self-locking operating device whereby said pressure fluid is caused to operate said plunger element and maintain said vehicle in raised position, a rigid stopper member on the vehicle for the application of lifting force thereto by said plunger element, spring means whereby said plunger element is so connected to said vehicle that when the jack is turned into a vertical position but is still off the ground the top of the jack is spaced away from said stopper member, means whereby said jack is adapted for swinging movement in one plane into and out of its operative position, and depending flanges on said stopper member so arranged that, on the weight of the vehicle pressing said stopper member on top of said jack, they project into the path of the head of said jack and constitute a positive stop against displacement of said jack in either of two directions from its vertical position.

5. Fluid pressure jacking apparatus for road vehicles comprising a pressure fluid reservoir, a jacking element, means for operating said jacking element by said pressure fluid, bearings for turnably supporting said jacking element on the vehicle, stop means for determining the inoperative position of said jacking element, stop means for determining the operative position of said jacking element, and a single spring serving automatically to hold said jacking element in either its operative or inoperative position according to whichever position it is turned.

6. Fluid pressure jacking apparatus for road vehicles comprising a pressure fluid reservoir, an extensible jacking element, means for operating said jacking element by said pressure fluid, bearings for turnably supporting said jacking element on the vehicle, stop means for determining the inoperative position of said jacking element, a stop for determining the operative position of said jacking element, a tension spring connected to the extensible end of said jacking element, and an anchorage for said spring on said vehicle such that on turning said jacking element horizontal the axis of the spring lies on one side of the axis of said bearings and lies on the other side of the axis of said bearings when said jacking element is turned vertical, thereby locking said jacking element automatically in either its horizontal or vertical position.

7. Fluid pressure jacking apparatus for vehicles comprising a pressure fluid reservoir, a jacking element, means for operating said jacking element by said pressure fluid, bearings for turnably supporting said jacking element, means for suspending said bearings, from said vehicle a rigid fixture located on said vehicle above said jack and adapted during the jacking operation to be pressed firmly on said jack by the weight of said vehicle against the action of said means, means adapted to project downward on opposite sides of the head of said jack so that said rigid fixture when pressing on said jack positively locks said jack against displacement from its operative position, stop means for determining the inoperative position of said jack, stop means for determining the operative position of said jack, and a single coil spring serving automatically to hold said jacking element in either its operative or inoperative position according to whichever position it is turned.

8. Fluid pressure jacking apparatus for vehicles comprising a pressure fluid reservoir, an extensible jacking element, means for operating said jacking element by said pressure fluid, a rigid stop member on the vehicle for application of lifting force thereto by said jacking element, bearings for turnably supporting said jacking element, spring means whereby said bearings are so supported from said vehicle that when the jacking element is in operative vertical position its top is spaced from said stopper member, depending flanges on said stopper member whereby on the weight of the vehicle pressing said stopper member on top of said jacking element displacement of said jacking element from its operative position is prevented, stop means for determining the inoperative position of said jacking element, a stop for determining the operative position of said jacking element, a tension spring connected to the extensible end of said jacking element, and an anchorage for said spring on said vehicle such that on turning said jacking element horizontal the axis of the spring lies on one side of the axis of said bearings and lies on the other side of the axis of said bearings when said jacking element is turned vertical, thereby locking said jacking element automatically in either its horizontal or vertical position.

In testimony whereof we affix our signatures.

JOHN FERGUSON STEVENSON.
GEORGE BOWMAN.